March 17, 1970 P. TABER 3,500,710

APPARATUS FOR PUNCHING OPENINGS IN SHEET MATERIAL

Filed June 16, 1967 3 Sheets-Sheet 1

INVENTOR
PHILIP TABER
BY Nolte & Nolte
ATTORNEYS

APPARATUS FOR PUNCHING OPENINGS IN SHEET MATERIAL

Filed June 16, 1967 3 Sheets-Sheet 2

INVENTOR
PHILIP TABER
BY Nolte & Nolte
ATTORNEYS

INVENTOR.
PHILIP TABER
BY
Nolte & Nolte
ATTORNEYS

United States Patent Office 3,500,710
Patented Mar. 17, 1970

3,500,710

APPARATUS FOR PUNCHING OPENINGS IN SHEET MATERIAL

Philip Taber, Nonquitt, South Dartmouth, Mass. 02748

Continuation-in-part of application Ser. No. 425,912, Jan. 15, 1965. This application June 16, 1967, Ser. No. 705,865
Int. Cl. B26f *1/14*
U.S. Cl. 83—588 5 Claims

ABSTRACT OF THE DISCLOSURE

The present invention includes a punching assembly having punch pins removably held in an upper member, an intermediary member for guiding the pins, and film support means for holding film and for cooperatively and matingly received the pins and punched material.

This application is a continuation-in-part of application Ser. No. 425,912, filed Jan. 15, 1965, and now abandoned.

The present invention relates to the punching of film or similar sheet material.

In particular, the present invention relates to the punching of film or similar sheet material to be used as part of a miniature assembly.

It is known to provide miniature electrical assemblies, for example, where tiny electrical components are grouped together in closely adjacent relationship so as to form a miniature electrical network of any desired type. These assemblies form circuit modules which have a wide variety of uses, and because of the extremely small size of such structure considerable difficulty is involved in accurate positioning of the various elements during the manufacture thereof as well as in holding of the various elements properly positioned with respect to each other in the final assembly.

Such circuit modules may include a plurality of tiny components, such as resistors, capacitors, and the like, which are arranged one next to the other in closely adjacent relationship and substantially in a common plane with all of the conductors of the various components respectively extending upwardly and downwardly from the bank of components which are arranged beside each other in close physical proximity. In order to properly position these tiny components so as to provide a circuit module of extremely small size, having a structure which includes any desired number of these components, it is necessary to provide sheets of film which are suitably punched so that the conductors of the various electrical components can pass upwardly through the punched openings of one sheet of film and downwardly through the punched openings of the other sheet of film, so that such sheets of film will serve to maintain all of the various components properly oriented relative to each other while stacked in close proximity.

Because of the great precision which is required in the punching of such sheets of film and because of the very small size of the openings therein and the precise location which these openings must have relative to each other, considerable problems are involved in the manufacture of punched films of this type.

It is accordingly a primary object of the present invention to provide a relatively inexpensive structure which may be used for punching film or similar sheet material of the above type.

In particular, it is an object of the present invention to provide a structure of the above type which can be used for reliably punching such film or sheet material even though a relatively large number of openings are required to be punched in relatively close proximity to each other.

Furthermore, it is an object of the present invention to provide a device of the above type which will operate reliably to punch a relatively large number of film sheets of the above type.

It is furthermore an object of the invention to provide a process according to which a device for punching film, or sheet material similar to film, can be manufactured in an extremely simple and inexpensive manner without sacrificing any precision.

In particular it is an object of the present invention to provide a process according to which the components of the final punching device can be very quickly and accurately assembled in a suitable molding fixture in which plastic bodies are molded so as to form components of the final punching tool.

Furthermore, the objects of the present invention include the provision of a process for manufacturing suitable templates which properly position the components used in the manufacture of the device as well as for properly positioning and transmitting forces to the relatively small punch pins which are used in the final structure.

Still another object of the present invention is to provide a structure capable of being used in the manufacture of a punch of the above type, this structure being relatively simple and inexpensive and including components which are very easy to assemble with each other so as to be used in a mold for the casting of the plastic bodies which form part of the final punching assembly.

Primarily, the punching device of the invention includes a die plate which is made of a single body of plastic material and which has an upper face which is adapted to engage and support the film, or similar sheet material, during the punching thereof, this die plate being formed with a plurality of openings passing therethrough perpendicularly to its upper face and having, in accordance with the invention, embedded therein a plurality of die bushings which are respectively coaxial with the openings passing through the die plate and which respectively have upper end faces which are flush with the upper surface of the die plate. The device of the invention further includes a pin guide plate also formed from a single body of plastic material, this pin guide plate having a lower surface adapted to engage the film which is to be punched, and the pin guide plate is formed with a plurality of openings passing therethrough coaxially with the openings of the die plate and perpendicular to the lower face of the pin guide plate which is adapted to engage the upper face of the film which is to be punched. A plurality of punch pins have their shanks extending into the openings of the pin guide plates to be guided by the latter, and during the punching operation these punch pins are depressed through the film into the die bushings so as to punch the film according to a predetermined pattern.

According to the process of the invention the die bushings are initially placed on elongated shank portions, of constant diameter, of a plurality of taper pins, respectively, which have also tapered shank portions against which the die bushings are pressed with a slight pressure. Then these die bushings and taper pins are passed through aligned openings of a pair of identical shrink templates which are parallel and spaced from each other and which have been placed, prior to receiving the taper pins, in a suitable molding fixture so that a molten plastic can be poured at least into the space between the shrink templates and around the tapered shank portions and die bushings which engage the surface of one of the templates outside of the space between the templates, so that the cast plastic material will form in this way a pair of plastic plates one of which will have the die bushings embedded therein and will form the die plate after the taper pins and shrink templates are removed, while the plate which is cast between the pair of shrink templates will form the pin guide plate.

The invention is illustrated, by way of example, in the accompanying drawings which form part of the application and in which.

Figure 1:
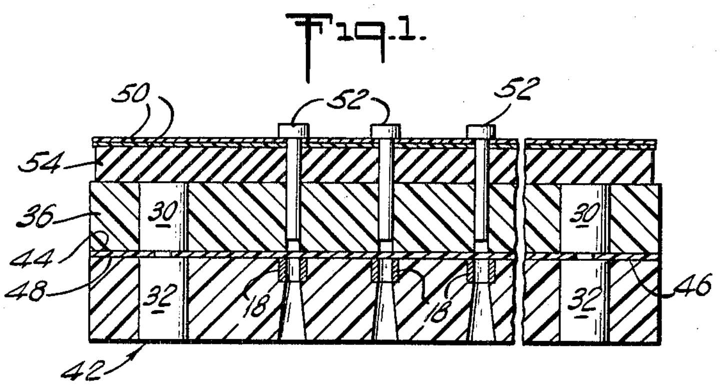
FIG. 1 is a fragmentary longitudinal sectional elevation of a punching tool assembly according to the invention, the section of FIG. 1 being taken along line 1—1 of FIG. 8 in the direction of the arrows.

In order to manufacture the tool of the invention it is first required to provide a master drawing of the pattern of openings in the final punched film, and because of the small size of these openings, as well as the small distance therebetween, this initial drawing is made at a scale several times greater than the scale of openings and distances therebetween in the final punched film. This scale may be four or five times as large as the final sizes of the distances between openings. In the initial drawing only a dot is made at the location where it is desired to have a hole in the final punched film.

This drawing is then photographically reduced in a known manner to a size which is slightly greater than that of the final punched film size, and this photographic reproduction forms a shrink template negative. Actually a plurality of these shrink template negatives are formed for a purpose described below. Then the same master drawing is photographically reduced precisely to the size of the final punched film, and a plurality of these photographic reductions are also provided so as to form dot stripper template negatives, the slightly oversized negatives forming the shrink template negatives.

The next step in the process is to coat four beryllium copper plates on both sides with a light-sensitive emulsion, which is also well known and which can be coated on these plates in a well known manner which does not form part of the present invention, and the thus-coated metal plates are exposed to the shrink template and dot sripper template negatives. Two of the metal plates are exposed at both of their sides to shrink template negatives which are properly oriented with respect to these plates, and the remaining two plates are each exposed to each of its opposed surfaces, but these latter two plates are exposed to dot template negatives which are properly oriented with respect to the latter plates which will become stripper plates, the first-mentioned plates, which are exposed to the shrink template negatives, becoming shrink templates.

After the plates are exposed in this manner they are suitably fixed and developed so that the images impressed on the emulsions are now in a form which enables the plates to be handled under ordinary lighting conditions, and the plates will therefore have thereon photographic reproductions at reduced scale of the dots on the master drawing and the distances between these dots will of course be reduced as compared with the distances on the master drawings. The thus-processed plates are now etched, each at both of its sides, so that as a result of this etching, holes will be produced at the locations of the dots, and in this way these holes will correspond to the patterns on the negatives. Thereafter the plates are hand-worked so as to enlarge the holes to the desired dimensions, this hand-working being in the form of reaming the holes to the desired diameters, for example, and in this way it becomes possible to very precisely produce a relatively large number of quite small holes in these metal plates with the holes located quite close to each other, if required by the particular module which is to include a film punched according to the pattern of holes which have been provided in this way in the metal plates. Of course, in the shrink templates the pattern of holes will be identical with those of the stripper plates the only difference being that the distances between the holes will be very slightly greater than the distances between the holes on the stripper plates.

Figure 4:
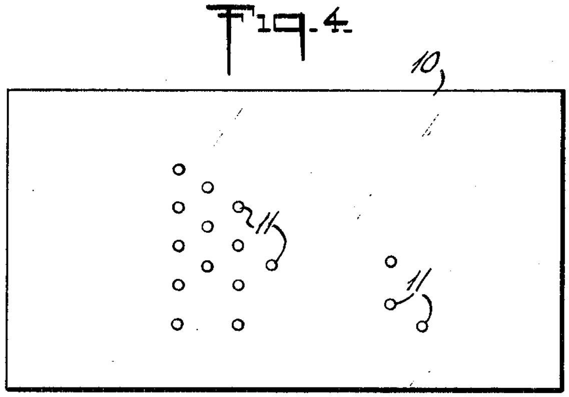
FIG. 4 illustrates a shrink template manufactured according to the invention and thereafter used in the process of the invention.

Referring to FIG. 4, there is shown therein a shrink template 10 formed with a plurality of openings 11 passing therethrough and manufactured in the manner described above. It is to be understood that the stripper plates are identical except that they are on a very slightly reduced scale as compared to the size of the templates 10.

Figure 2:
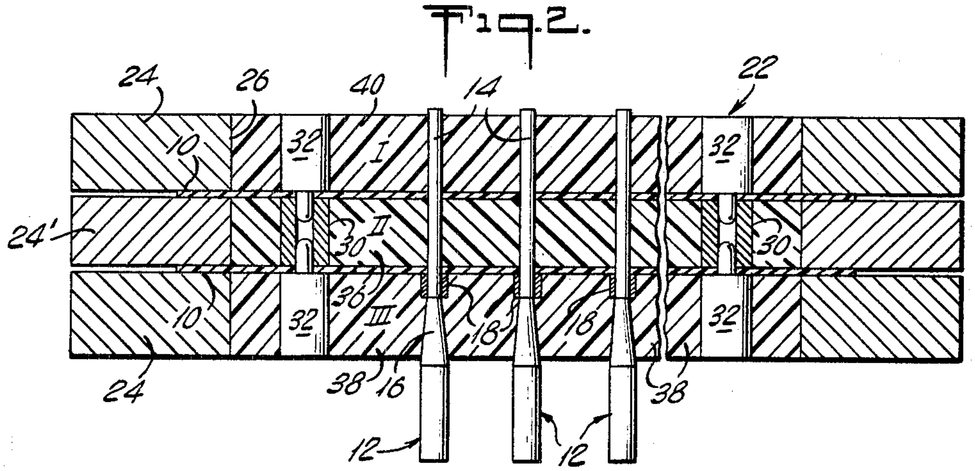
FIG. 2 is a fragmentary longitudinal sectional elevation of structure of the invention used according to the process of the invention for manufacture of the punching tool, the section of FIG. 2 being taken along line 2—2 of FIG. 5 in the direction of the arrows.
Figure 6:
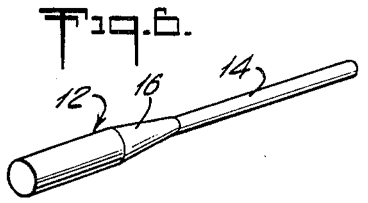
FIG. 6 is a perspective illustration of a taper pin according to the invention.
Figure 7:
FIG. 7 is a perspective illustration of a die bushing adapted to be assembled with the taper pin of FIG. 6 during the manufacture of the device of the invention.
Figure 5:
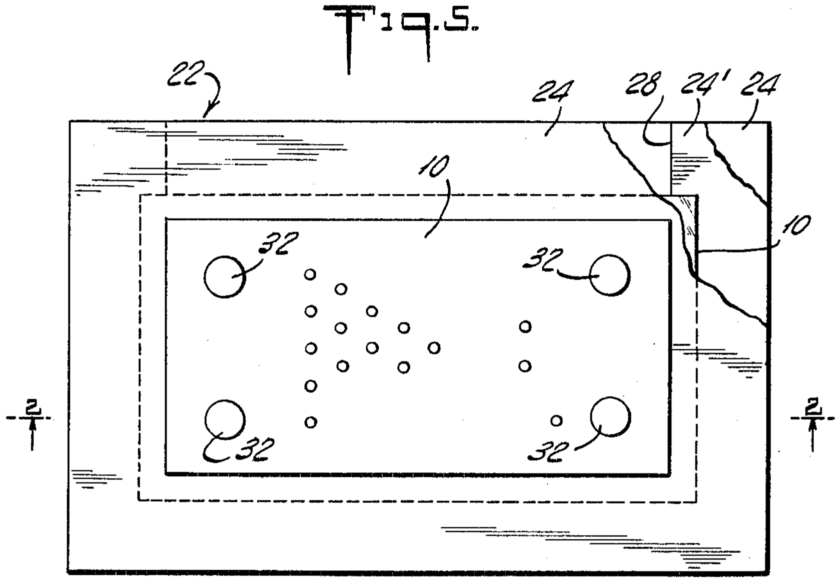
FIG. 5 illustrates the structure of the invention assembled with a suitable molding fixture preparatory to casting the plastic for forming the punching tool of the invention.

Referring now to FIGS. 2 and 5, as well as FIGS. 6 and 7, the next stage in the manufacture of the punch of the invention is to provide elongated taper pins 12 as shown in FIG. 6. Each of the taper pins 12 has an elongated shank portion 14 of a constant diameter, and next to the shank portion 14 each taper pin 12 has an intermediate shank portion 16 of a tapered configuration increasing in diameter in a direction away from the shank portion 14. A plurality of these taper pins 12 are respectively assembled with die bushings 18 (FIG. 7) which are simply in the form of small metal axially-bored cylinders, the diameters of the bores 20 thereof being equal to the diameters of the shank portions 14 of the taper pins 12, so that the die bushings 18 can be slipped onto the shank portion 14 into engagement with the tapered shank portions 16 of a plurality of taper pins 12, respectively.

These assembled die bushings and taper pins are assembled together with the two shrink templates 10 in a molding fixture 22 the details of which are apparent from FIGS. 2 and 5. This molding fixture 22 includes three outer substantially rectangular frame members 24, and it will be seen that the pair of shrink templates 10 are of a larger size than the central rectangular openings 26 of each frame 24. The pair of outer frames 24 of the molding assembly 22 are identical while the intermediate frame 24' is formed along one of its sides with an elongated cutout 28 indicated in dotted lines in FIG. 5. In effect the intermediate frame member 24 of the mold fixture 22 has only three legs, namely a bottom leg and a pair of upright legs, as viewed in FIG. 5, so that in this way there remains, between the upright legs, the opening 28. Because the shrink templates 10 are larger than the openings 26, the peripheral portions of the shrink templates will be gripped between the overlying members 24, 24' of the molding assembly 22, and it will be noted that with the structure in the position shown in FIG. 5 the opening 28 gives access to the space between the pair of shrink templates 10.

Referring to FIG. 2 in particular, the several bushings 18 are slipped onto the shank portions 14, respectively, and pressed with a slight pressure against the tapered shank portions 16. Then the templates 10 are placed between the frame members of the molding fixture 22. As may be seen from FIGS. 2 and 5, a locating bushing 30 is situated between the pair of templates 10 with its axial bore aligned with a pair of aligned openings of the templates 10, and a pair of locating bushings 32 respectively engage the opposed exterior surfaces of the templates 10 and have their shanks extending through the openings of the templates into the bore of the locating bushings 30. These locating bushings and pins are simple metallic elements of cylindrical configuration. As may be seen from FIG. 5, in the illustrated example there are four assemblies of these locating bushings and pins, although it is to be understood that any desired number as low as two or greater than two of these assemblies 30, 32 may be provided depending upon the nature of the tool. Thus, the locating pins and bushings will properly align the identically constructed shrink templates with respect to each other, and the frame members 24 are pressed against each other so that the outer peripheries of the templates are tightly gripped between the frame members 24 of the molding fixture, and with the templates thus aligned the taper pins 12 with the die bushings 18 thereon are placed with their elongated shank portions 14 of constant diameter through the aligned openings of the templates 10, in the manner indicated most clearly in FIG. 2. Thus, it will be seen that the die bushings 18 engage one of the templates 10 at a face thereof which is directed away from the space between the pair of templates.

With the structure thus positioned and assembled, which is to say in the orientation shown in FIG. 5 where the opening of the intermediate frame 24' is directed upwardly, a molten tooling epoxy is poured into the cavity I indicated in FIG. 2 between the pair of templates 10, and this cavity is filled with a molten plastic to the desired elevation which is at least as high as the upper edge of the opening 26 of the frame member 24, so that in this way a plastic plate 36 is formed in the space between the templates 10, and of course this plate 36 will have the locating bushings 30 embedded therein and in addition will have openings extending therethrough formed by the shank portions 14 of the taper pins 12.

The first pouring is permitted to set in the space between the templates 10, and this set plastic is not heat cured at this time. Instead the assembled fixture is placed with the surface of the lower template 10 of FIG. 2, which is engaged by the bushings 18, directed upwardly, so that in this way the opening 26 which is visible in FIG. 5 is in a horizontal plane, and now a second pouring of tooling epoxy is made to fill this cavity 26 which is visible in FIG. 5. When this plastic sets the lower locating pin 32 of FIG. 2 will become embedded in a plastic plate 38 which is thus cast in the cavity II formed by the opening 26 which is visible in FIG. 5. Thereafter, for a purpose described below, the entire fixture which has its frames 24 fastened together by suitable clamps in a manner well known in the art is inverted, after the plate 38 has set up, and a plate 40 is cast in an identical manner in the cavity 26 on the other side of the assembly 22 from that which is visible in FIG. 5, and thus a plate 40 will be formed in the cavity III indicated in FIG. 2. Although the invention of course is not limited to any particular sizes, in actual practice the thickness of the cast plates is on the order of one-half inch while the shank portion 14 and of course the inner diameter of the die bushings 18 may be on the order of one-eighth inch.

After at least the first and second pourings, and a third pouring if there has been a third pouring, and after the cast plates have set sufficiently, the cast plates together with the shrink templates and the taper pins and die bushings are removed from the frames 24 so that the latter will have no restraining influence while the assembly of cast plates, shrink templates, pins and bushings are heat cured together.

Finally, the taper pins are withdrawn, and after they have been removed the shrink templates are removed and discarded. They are thin enough to wrinkle or tear at their openings during heat curing.

It will thus be seen that there has been provided in this way the plates 36 and 40 which have identical openings passing therethrough and formed by the shank portions 14, although only the plate 36 has locating bushings 30 while the plate 40 carries the locating pins 32. The plate 38 will have embedded therein the die bushings 18 as well as enlarged tapered openings extending downwardly from the die bushings 18, and of course this plate 38 will also carry locating pins 32 which cooperate with locating bushings 30, respectively.

Of course, the bushings were suitably cleaned before they were assembled with the taper pins in the molding assembly, and the taper pins themselves were soaked in a suitable mold release before the parts were assembled with the molding unit 22.

The die bushings 18 form with the plate 38 a lower die plate assembly 42, shown most clearly in FIG. 1, and the upper end faces of the die bushings 18 will of course be flush with the upper surface 44 of the die plate 38, while the plate 36 will of course form a pin-guiding plate shown in FIG. 1 above the die plate 42. The lower surface 46 of the pin-guide plate 36 and the upper surface of the die plate assembly 42 can be suitably ground so as to lie flat against each other to insure close contact, and in this way the bushings will be sharpened so as to provide sharp cutting of the openings through the film. A sheet of film 48 is indicated in FIG. 1 between the plates 36 and 38 preparatory to being punched, and this film 48 may be preformed with openings adapted to receive the shanks of the locating pins 32 so that the film will be properly positioned between the pin-guide plate 36 and the die plate assembly 42. Now the dot stripper templates 50, which have the same structure as the templates 10 but are of only a slightly smaller size, are placed against each other and a plurality of punch pins 52 are passed therethrough with the enlarged ends of the pins engaging the upper surface of the upper stripper plate 50, as indicated in FIG. 1. The arrangement of these punch pins is also apparent from FIG. 8 which in addition shows the locating assemblies and the plastic plate 36 beneath the stripper plate 50.

Figure 8:
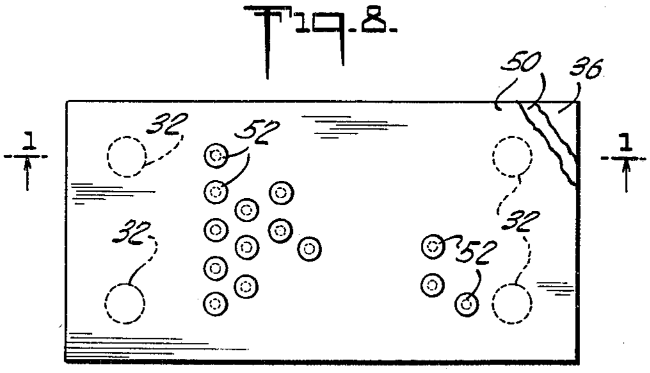
FIG. 8 is a top plan view of the pushing tool of FIG. 1, FIG. 8 showing the entire punching tool.

These punch pins 52, before extending through the openings of the plate 36 are passed through a layer or sheet of a resilient material of suitable thickness, at least substantially thicker than the sheet of film 48, and after being forced through the sheet 54, which may simply be foam rubber, for example, the shanks of the punch pins are passed into the openings of the pin guide plate 36, and in this way the assembly shown in FIGS. 1 and 8 is provided. The layer of foam rubber 54 through which the punch pins are pushed serves as a spring and returns the punches into the pin guide plate 36 where they have the rest positions indicated in FIG. 1, so that in this way the stripping operation, which is to say separation of the punched film 48 from the punch pins 52, is accomplished.

With the parts positioned as shown in FIGS. 1 and 8, any suitable structure may be relied upon to depress the several punch pins 52 so as to punch openings through the film 48, and of course the material punched from the sheet 48 can collect in the enlarged tapered portions of the openings of the plate 38 which are beneath the die bushings embedded therein, and from time to time this plate 38 can simply be raised to clear away the punched out portions.

During the punching operations the plate 38 can simply rest on any suitable table, and if desired a suitable roller situated at a suitable height above and supported for rotation by the table can have its bottom surface placed in engagement with the upper ends of the punch pins while the operator shifts the entire assembly shown in FIG. 1 beneath such a roller so that in this way the punch pins are depressed in a given sequence and the desired pattern of openings is formed in the film 48. Also, the plate 38 can be mounted in any desired manner on a pair of end blocks which might raise the plate 38 slightly above the surface of the table, and such end blocks can, if desired, be fixed by screws or the like to the plate 38.

In order to carry out the operation, the film to be punched is simply placed between the plates with the locating pins passing through the preformed openings and then the top half of the die placed down on top of the film and pressure is applied, either through a flat plate or a roller as described above, to the punches so that the stripper plates transfer the force uniformly to the foam rubber, compressing the latter, and the film becomes punched. The foam rubber acts against the stripper plates to push them away from the plate 36 so as to retract the punches into the pin guide plate 36. Then the die plate and the pin-guide plate are separated from each other and the punched film is removed.

Figure 3:
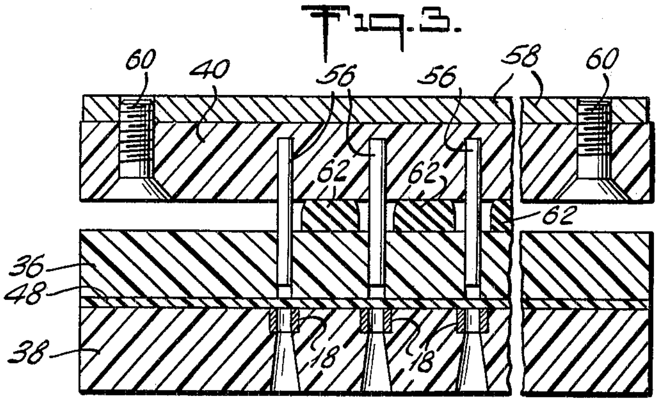
FIG. 3 is a fragmentary longitudinal sectional elevation similar to the section of FIG. 1 but showing the structure of another embodiment of a punching tool according to the invention, and it will be noted that in FIGS. 1 and 3 sheets of film are illustrated in position to be punched.

In the event that the density of the pins is extremely high in any given area, which is to say a large number of punch pins must be located quite close to each other in a given area, and if there are large quantities of films to be punched, then the third pouring referred to above in order to provide the plate 40 is resorted to, so as to produce a tool as shown in FIG. 3, this particular tool being capable of withstanding severer operations than the tool of FIG. 1. As may be seen from FIG. 3, the structure described above is used in the embodiment of FIG. 3 also. The same plate 36 and the same plate 38 are used, but in this case the plate 40 is formed with suitable countersunk openings at its upper face, as viewed in FIG. 3, so as to receive the enlarged conical head ends of the punch pins 56 which are thus countersunk into the plate 40, and these punch pins have their shanks extending into the same openings of the plate 36 as the shanks of the punch pins 52. A steel plate 58 is fixed by screws 60 to the upper surface of the plate 40 so as to form a single unitary structure with the plate 40, the punch pins 56, and the steel plate 58, and between the plate 40 and the plate 36 there are situated relatively thick strips 62 of elastic compressible material which has, however, a stronger resilient force and a greater resistance to compression than foam rubber, a cast silicon rubber molded material being suitable for this purpose, and thus the assembly shown in FIG. 3 will be provided. The upper surfaces of strips 62 are of a smaller area than their lower surfaces, and their sides taper, as shown in FIG. 3, so that when the upper strip surfaces approach the lower strip surfaces during compression of the strips 62, their sides will not bulge outwardly into engagement with any pins 56. During compression the width of the strips does not exceed the width of its bottom surface: The strips 62 are arranged to extend around high pin density areas.

Thus, where the structure of FIG. 3 is to be manufactured the third plate 40 will be cast immediately after the second plate is cast, and then all three of the cast plates will be heat cured together after the molding fixture is removed, as described above. The operations are carried out in the embodiment of FIG. 3 precisely in the same way that they were carried out in the embodiment of FIG. 1, and it will be noted that in this embodiment when the plate 40 is depressed so as to carry out the punching operations a second locating pin which has been embedded in the plate 40 will enter into each of the locating bushings, so that in this way a further precise guiding of the punching pins 56 during operation is achieved. Of course, these punch pins 56 are considerably longer than the punch pins 52 of FIG. 1.

Figure 9:
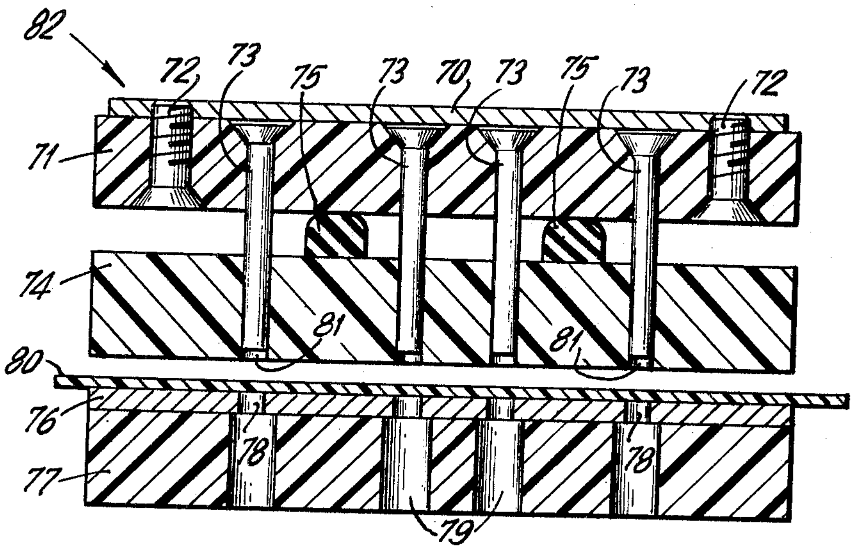
FIG. 9 is cross-sectional view of a portion of a punching tool assembly according to another embodiment of the invention.

Referring now to FIG. 9, which is a fragmentary longitudinal sectional elevation of another embodiment of the present punching tool assembly, this embodiment does away with the need for bushings and permits use of non-machined pins in place of tapered pins. A plate 70 is secured to member 71 by means of screws 72. Plate 70 serves as retaining means to keep punch pins 73 from falling out of member 71. Pins 73 extend to and into bores 81 in pin guide member 74 which is spaced from member 71. Intermediate pin guide member 74 and member 71 are strips 75 of elastic compressible material similar in shape and material to strips 62 already disclosed. A steel plate 76, having holes 78 of predetermined and selected diameters formed therethrough, is disposed beneath and spaced from pin guide member 74. Stationary member 77 provides rigidity to steel plate 76 and has formed therethrough cylindrical holes 79 for receiving parts that have been punched from film 80. Film 80 is caused to engage the upper surface of steel plate 76, as shown in FIG. 9, which represents a rest position for the punch assembly.

In operation, punch assembly 82 may be inserted into a press or other suitable apparatus and pressure is applied to plate 70 such that punch pins 73 are caused to move downward through holes 81 toward film 80. This downward movement of pins 73 has an associated downward movement of member 71 toward pin guide member 74, thereby compressing strips 75. Further downward movement of pins 73 will cause them to engage film 80 and to punch holes of predetermined size through film 80. The material which occupied the spaces of the holes in film 80 will be pushed through holes 78 and plate 76 and into the void of the holes 79 and stiffener member 77.

What I claim is:

1. In an assembly for punching openings through film or similar sheet material, a lower die plate means having an upper face adapted to engage the film or other sheet material which is to be punched, said die plate having a plurality of openings passing therethrough perpendicularly to said upper face of said die plate means; a pin-guide plate made of a solid body of material and formed with a plurality of elongated openings passing therethrough coaxially with said openings of said die plate, said pin-guide plate having a lower surface adapted to engage the film or other sheet material which is to be punched and said openings which extend through said guide plate being of a constant diameter; a stripper plate also made of a solid body of material, said stripper plate being situated over and spaced from said pin-guide plate so that the latter is situated between said stripper plate and said die plate, said stripper plate also being formed with a plurality of openings passing therethrough coaxially with said openings of said pin-guide plate and said openings of said die plate means; a plurality of strips of resilient, elastic compressible material situated between and engaging said stripper plate and pin-guide plate for maintaining them apart from each other, said strips of elastic material having a substantial thickness; a plurality of elongated punch pins passing through the aligned openings of said stripper plate and pin-guide plate toward but terminating short of the lower face of said pin-guide plate, said strips of elastic material having a thickness substantially greater than the sheet of film or the like which is to be punched, so that when the film or other sheet material is situated between and engages said upper face of said die plate means and said lower face of said pin-guide plate, said stripper plate and said punch pins therewith can be advanced toward said die plate in opposition to the resilient force of said strips of elastic material, compressing the latter and reducing the thickness thereof, so as to advance said punch pins downwardly through a film or other sheet material situated between said die plate means and pin-guide plate and into said openings in said die plate means for punching openings through the film or other sheet material, whereby when the force compressing said strips will expand to raise said stripper plate and said punch pins therewith out of the openings which have been punched in the film.

2. In an assembly as recited in claim 1, said punch pins respectively having upper head ends which are countersunk into said stripper plate and are flush with the upper surface of said stripper plate which is directed away from said pin-guide plate.

3. In an assembly as recited in claim 2, a steel plate engaging said upper face of said stripper plate and fastened thereto so that the force required for advancing the punch pins through the sheet material can be applied to said steel plate.

4. The assembly of claim 1 wherein said strips are shaped to have different areas of contact with said pin-guide plate and said stripper plate whereby upon compression said strips do not engage said pins.

5. The assembly of claim 4 wherein said strips have tapered sides whereby said strips do not bulge to an increased width with respect to the largest area of contact upon compression.

References Cited

UNITED STATES PATENTS

| | | | |
|---|---|---|---|
| 1,746,043 | 2/1930 | McGuire | 83—637 X |
| 1,995,466 | 3/1935 | Bishop | 83—691 X |
| 2,278,288 | 3/1942 | Sadler | 83—635 X |
| 2,313,801 | 3/1943 | Carll | 83—691 |
| 2,379,003 | 6/1945 | Hedberg | 83—620 X |
| 3,100,411 | 8/1963 | Airlie | 83—687 X |
| 3,029,677 | 4/1962 | Metzger | 83—620 |
| 3,228,275 | 1/1966 | Taber | 83—687 X |

WILLIAM S. LAWSON, Primary Examiner

U.S. Cl. X.R.

83—620, 685, 687, 691